United States Patent
Ijuin et al.

(10) Patent No.: US 11,121,425 B2
(45) Date of Patent: Sep. 14, 2021

(54) PACKAGING MATERIAL FOR POWER STORAGE DEVICES, AND METHOD OF PRODUCING PACKAGING MATERIAL FOR POWER STORAGE DEVICES

(71) Applicant: TOPPAN PRINTING CO., LTD., Tokyo (JP)

(72) Inventors: Wataru Ijuin, Tokyo (JP); Masayoshi Suzuta, Tokyo (JP)

(73) Assignee: TOPPAN PRIMING CO., LTD., Tokyo (JP)

( * ) Notice: Subject to any disclaimer, the term of this patent is extended or adjusted under 35 U.S.C. 154(b) by 198 days.

(21) Appl. No.: 16/104,772

(22) Filed: Aug. 17, 2018

(65) Prior Publication Data
US 2018/0366693 A1 Dec. 20, 2018

Related U.S. Application Data

(63) Continuation of application No. PCT/JP2017/005513, filed on Feb. 15, 2017.

(30) Foreign Application Priority Data

Feb. 18, 2016 (JP) .............................. JP2016-028892
Apr. 6, 2016 (JP) .............................. JP2016-076627

(51) Int. Cl.
*H01M 50/124* (2021.01)
*B65D 65/40* (2006.01)
(Continued)

(52) U.S. Cl.
CPC .......... *H01M 50/124* (2021.01); *B65D 65/40* (2013.01); *B65D 75/32* (2013.01); *C09J 7/29* (2018.01);
(Continued)

(58) Field of Classification Search
None
See application file for complete search history.

(56) References Cited

U.S. PATENT DOCUMENTS 4,343,852 A * 8/1982 Isaka ...................... B32B 27/08
428/216
5,306,542 A * 4/1994 Bayer .................... B32B 27/08
428/192
(Continued)

FOREIGN PATENT DOCUMENTS

CN 104425775 * 3/2015 ............. B32B 15/04
EP 2 779 265 A1 9/2014
(Continued)

OTHER PUBLICATIONS

Yamashita—JP 2002-056824 A—MT—silicone treatment to reduce friction—2002 (Year: 2002).*
(Continued)

*Primary Examiner* — Callie E Shosho
*Assistant Examiner* — John Vincent Lawler
(74) *Attorney, Agent, or Firm* — Foley & Lardner LLP

(57) ABSTRACT

The present invention relates to a packaging material for a power storage device, the packaging material including at least a slip agent layer, a substrate layer, an adhesive layer, a metal foil layer, a sealant adhesive layer, and a sealant layer, in this order, wherein the slip agent layer contains a fatty acid amide and a fatty acid bisamide, or a fatty acid amide and silicone oil.

8 Claims, 3 Drawing Sheets

(51) Int. Cl.
*B65D 75/32* (2006.01)
*H01G 11/84* (2013.01)
*H01G 11/78* (2013.01)
*C23C 22/00* (2006.01)
*C23C 22/22* (2006.01)
*H01G 11/82* (2013.01)
*C09J 7/29* (2018.01)
*H01G 11/80* (2013.01)

(52) U.S. Cl.
CPC ............ *C23C 22/00* (2013.01); *C23C 22/22* (2013.01); *H01G 11/78* (2013.01); *H01G 11/80* (2013.01); *H01G 11/82* (2013.01); *H01G 11/84* (2013.01); *C09J 2203/33* (2013.01); *C09J 2301/208* (2020.08); *C09J 2400/163* (2013.01); *C09J 2451/00* (2013.01); *C09J 2467/006* (2013.01); *C09J 2477/006* (2013.01); *Y02E 60/13* (2013.01)

(56) References Cited

U.S. PATENT DOCUMENTS

| | | | | |
|---|---|---|---|---|
| 2004/0126518 | A1* | 7/2004 | Mendes | C08L 23/10 428/34.8 |
| 2014/0335403 | A1* | 11/2014 | Akita | B32B 7/12 429/176 |
| 2016/0049621 | A1* | 2/2016 | Hashimoto | B32B 27/26 429/176 |
| 2016/0060476 | A1* | 3/2016 | Chen | C09D 123/06 174/110 SR |
| 2016/0172638 | A1 | 6/2016 | Amano et al. | |

FOREIGN PATENT DOCUMENTS

| | | | | |
|---|---|---|---|---|
| JP | 2002/056824 | * | 2/2002 | .......... H01M 2/0277 |
| JP | 2002-216713 | A | 8/2002 | |
| JP | 2002/216714 | * | 8/2002 | ............. B65D 65/40 |
| JP | 2002-216714 | A | 8/2002 | |
| JP | 2005/032456 | * | 2/2005 | ............. B32B 15/08 |
| JP | 4940496 | B2 | 5/2012 | |
| JP | 2015-065159 | A | 4/2015 | |
| JP | 5725224 | B1 | 5/2015 | |
| WO | WO-2011/099129 | A1 | 8/2011 | |
| WO | WO-2011099129 | A1 * | 8/2011 | .......... H01M 2/0277 |
| WO | WO-2015/035515 | A1 | 3/2015 | |

OTHER PUBLICATIONS

Yamashita—JP 2002-216714 A—MT—packaging battery w—amide slip layer—2002 (Year: 2002).*
Rivera—cerium oxide conversion coating on aluminum—surf.coat. tech.—2004 (Year: 2004).*
Tanaka—JP 2005-032456 A—MT—packaging w—slip agents—2005 (Year: 2005).*
Matsui—WO 2011-099129 A1—Euro D#3—Original—Composite multilayer film—Google Patents—2011 (Year: 2011).*
Tuscany Diet—List of fatty acids_ IUPAC and common names (Year: 2020).*
Masayoshi—Suzuta—CN104425775—sister of ISR D#1—MT—packaging for Li-Ion battery—Mar. 18, 2015 (Year: 2015).*
Extended European Search Report dated Feb. 15, 2019 in corresponding application No. 17753216.5.
International Search Report with English language translation and Written Opinion issued in International Application No. PCT/JP2017/005513 dated May 16, 2017.
Office Action dated Dec. 29, 2020 for corresponding Chinese Patent Application No. 2017800112174.
Office Action dated Mar. 2, 2021 for corresponding Japanese Patent Application No. 2018-500151.

* cited by examiner

PACKAGING MATERIAL FOR POWER STORAGE DEVICES, AND METHOD OF PRODUCING PACKAGING MATERIAL FOR POWER STORAGE DEVICES

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/005513, filed on Feb. 15, 2017, which is based upon and claims the benefit of priority to Japanese Patent Application Nos. 2016-028892, filed on Feb. 18, 2016, and 2016-076627, filed on Apr. 6, 2016. The disclosures of which are all hereby incorporated herein by reference in their entireties.

TECHNICAL FIELD

The present invention relates to a packaging material for a power storage device and a method of producing a packaging material for a power storage device.

BACKGROUND ART

Power storage devices are known to include, for example, secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus attention is being given to lithium ion batteries for their high energy density. Packaging materials for lithium ion batteries have conventionally been metal cans; however, multilayer films are increasingly used because they are lightweight, highly heat dissipating, and produced at low cost.

Such a lithium ion battery using the multilayer film as a packaging material uses a configuration in which battery contents (e.g., cathode, separator, anode, electrolyte) are covered with a packaging material including an aluminum foil layer to thereby prevent moisture from penetrating into the battery. A lithium ion battery using such a configuration is referred to as an aluminum laminated lithium ion battery.

A known aluminum laminated lithium ion battery is, for example, an embossed lithium ion battery. In such an embossed lithium ion battery, a recessed portion is formed at part of the packaging material by cold forming, battery contents are stored in the recessed portion, and the rest of the packaging material is folded back, followed by heat sealing the edge portions (see, for example, PTL 1). With such a lithium ion battery, a recess formed deeper by cold forming enables storage of more battery contents to achieve higher energy density.

CITATION LIST

[Patent Literature] [PTL 1] JP 4940496 B2

SUMMARY OF THE INVENTION

Technical Problem

For the improvement of the drawing performance, particularly the performance of deep drawing of the packaging material for a power storage device, slippage is required for the outermost layer of the packaging material for a power storage device. To improve the slippage, the outermost layer surface of the packaging material for a power storage device may be coated with a slip agent (e.g., erucic acid amide), as disclosed in PTL 1. However, when heat sealing is continuously performed in the battery cell production process using the packaging material of PTL 1, the slip agent is accumulated in the seal bar, eventually carbonized and solidified by heat during sealing, and attached to the seal bar. Since the attached materials cause sealing failure due to jamming by foreign materials during sealing, it is necessary to frequently clean the heat seal bar to prevent sealing failure.

The present invention has been made in view of the above circumstances, and has a first object to provide a packaging material for a power storage device, the packaging material having sufficient deep drawing formability and being capable of better preventing sealing failure during heat sealing, and to provide a method of producing the packaging material for a power storage device.

Furthermore, bar codes are typically printed on power storage devices using inkjet ink for lot tracing. To reduce bar-code reading errors caused by smearing of inkjet ink, the outermost layer of the packaging materials for power storage devices is coated with a silicone material. However, the inventors' findings revealed that the silicone material may promote accumulation of the slip agent in the seal bar.

The present invention has been made in view of the above circumstances, and has a second object to provide a packaging material for a power storage device, the packaging material having sufficient deep drawing formability and printability, and being capable of better preventing sealing failure during heat sealing, and to provide a method of producing the packaging material for a power storage device.

Solution to Problem

First Invention

To achieve the above first object, the first invention provides a packaging material for a power storage device, the packaging material including at least a slip agent layer, a substrate layer, an adhesive layer, a metal foil layer, a sealant adhesive layer, and a sealant layer in this order; wherein the slip agent layer contains a fatty acid amide and a fatty acid bisamide, the fatty acid amide has a content in the range of 70 to 30 mass %, and the fatty acid bisamide has a content in the range of 30 to 70 mass %, based on the total mass of the fatty acid amide and the fatty acid bisamide. Such a packaging material for a power storage device has sufficient deep drawing formability, and is capable of better preventing sealing failure during heat sealing.

Second Invention

To achieve the above second object, the second invention provides a packaging material for a power storage device, the packaging material including at least a slip agent layer, a substrate layer, an adhesive layer, a metal foil layer, a sealant adhesive layer, and a sealant layer in this order; wherein the slip agent layer contains a fatty acid amide and silicone oil, the fatty acid amide has a content in the range of 3 to 10 mg/m$^2$, and the slip agent layer has a surface concentration of Si in the range of 0.3 to 1.2 atm %, as measured by X-ray photoelectron spectroscopy. Such a packaging material for a power storage device has sufficient deep drawing formability and printability, and is capable of better preventing sealing failure during heat sealing.

In the present invention, the fatty acid amide is preferably a saturated fatty acid amide. Use of the saturated fatty acid amide facilitates the process of forming the slip agent layer, as described later.

In the present invention, the substrate layer is preferably a polyester film or a polyamide film. Particularly, when the substrate layer is a polyester film, better effects of the packaging material for a power storage device of the second invention can be enjoyed, as described later.

In the present invention, the packaging material preferably further includes anticorrosion treatment layers provided on both surfaces of the metal foil layer. With this configuration, the adhesion between the substrate layer and the metal foil layer can be more improved.

In the present invention, the anticorrosion treatment layers each preferably contain a rare earth element oxide, and phosphoric acid or phosphate. With this configuration, the adhesion between the substrate layer and the metal foil layer can be more improved.

In the present invention, the rare earth element oxide is preferably cerium oxide. With this configuration, the adhesion between the substrate layer and the metal foil layer can be more improved.

Moreover, the present invention provides a method of producing a packaging material for a power storage device, the method including: a step of bonding a substrate layer on one surface of a metal foil layer with an adhesive layer interposed therebetween; a step of forming a sealant layer on a surface of the metal foil layer on a side opposite to the adhesive layer with a sealant adhesive layer interposed therebetween; and a step of forming a slip agent layer on a surface of the substrate layer on a side opposite to the adhesive layer; wherein the slip agent layer contains a fatty acid amide and a fatty acid bisamide, the fatty acid amide has a content in the range of 70 to 30 mass %, and the fatty acid bisamide has a content in the range of 30 to 70 mass %, based on the total mass of the fatty acid amide and the fatty acid bisamide. This production method can produce a packaging material for a power storage device, the packaging material having sufficient deep drawing formability and being capable of better preventing sealing failure during heat sealing.

Furthermore, the present invention provides a method of producing a packaging material for a power storage device, the method including: a step of bonding a substrate layer on one surface of a metal foil layer with an adhesive layer interposed therebetween; a step of forming a sealant layer on a surface of the metal foil layer on a side opposite to the adhesive layer with a sealant adhesive layer interposed therebetween; and a step of forming a slip agent layer on a surface of the substrate layer on a side opposite to the adhesive layer; wherein the slip agent layer contains a fatty acid amide and silicone oil, the fatty acid amide has a content in the range of 3 to 10 mg/m$^2$, and the slip agent layer has a surface concentration of Si in the range of 0.3 to 1.2 atm %, as measured by X-ray photoelectron spectroscopy. This production method can produce a packaging material for a power storage device, the packaging material having sufficient deep drawing formability and printability, and being capable of better preventing sealing failure during heat sealing.

Advantageous Effects of the Invention

The present first invention can provide a packaging material for a power storage device, the packaging material having sufficient deep drawing formability, and being capable of better preventing sealing failure during heat sealing. Moreover, the present second invention can provide a packaging material for a power storage device, the packaging material having sufficient deep drawing formability and printability, and being capable of better preventing sealing failure during heat sealing. Furthermore, the present invention can provide a method of producing the packaging material for a power storage device.

DESCRIPTION OF REPRESENTATIVE EMBODIMENTS

Figure 1:
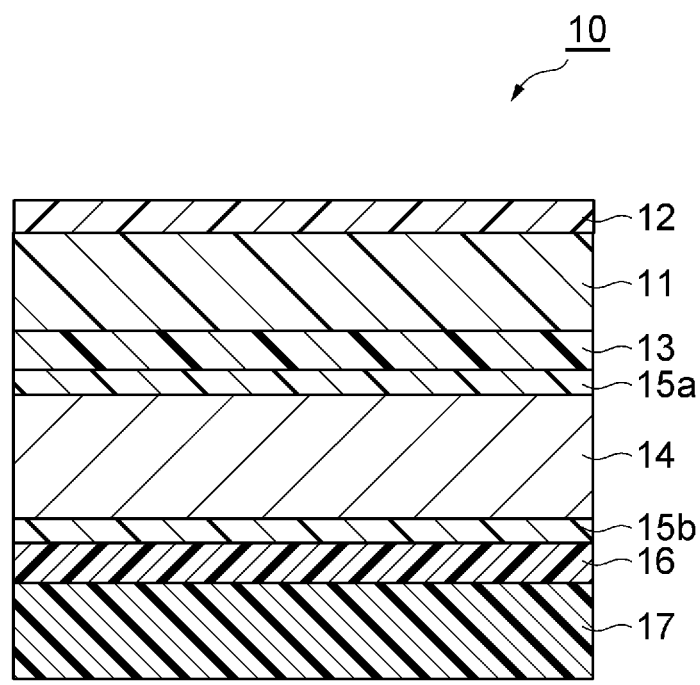
FIG. 1 is a schematic cross-sectional view of a power storage device packaging material, according to an embodiment of the present invention.

With reference to the drawings, preferred or representative embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. In the embodiments, the same or corresponding components are denoted by the same reference characters, and duplicate description thereof will be omitted.

First Embodiment

[Packaging Material for Power Storage Device]

A packaging material (packaging material for a power storage device) 10 of the present embodiment includes at least a slip agent layer, a substrate layer, an adhesive layer, a metal foil layer, a sealant adhesive layer, and a sealant layer in this order. FIG. 1 is a schematic cross-sectional view illustrating an embodiment of a packaging material for a power storage device of the present invention. As shown in FIG. 1, the packaging material 10 of the present embodiment is a laminate sequentially laminated with a substrate layer 11, a slip agent layer 12 provided on a surface side of the substrate layer 11, an adhesive layer 13 provided on the substrate layer 11 on a side opposite to the slip agent layer 12, a metal foil layer 14 provided on the adhesive layer 13 on a side opposite to the substrate layer 11 and having anticorrosion treatment layers 15a and 15b on opposing surfaces thereof, a sealant adhesive layer 16 provided on the metal foil layer 14 on a side opposite to the adhesive layer 13, and a sealant layer 17 provided on the sealant adhesive layer 16 on a side opposite to the metal foil layer 14. The anticorrosion treatment layer 15a is provided on an adhesive layer 13 side surface of the metal foil layer 14, and the anticorrosion treatment layer 15b is provided on a sealant adhesive layer 16 side surface of the metal foil layer 14. The slip agent layer 12 may be directly formed on the substrate layer 11, or other layers, such as easily-adhesive treatment layers containing an ester, urethane, acrylic, or the like, may be provided between both layers. In the packaging material 10, the slip agent layer 12 is the outermost layer and the sealant layer 17 is the innermost layer. That is, the packaging material 10 is used, with the slip agent layer 12 being on the outside of the power storage device and the sealant layer 17 being on the inside of the power storage device. The respective layers will be described below.

(Substrate Layer 11)

The substrate layer 11 imparts heat resistance to the packaging material in the sealing step during production of the power storage device, and helps to better prevent formation of pinholes that may occur during forming or distribution. Particularly in the case of, for example, a packaging material for a large power storage device, the substrate layer 11 can also impart scratch resistance, chemical resistance, insulating properties or the like.

The substrate layer 11 preferably includes a resin film made of a resin having insulating properties. Examples of the resin film include stretched or unstretched films, such as polyester films, polyamide films, and polypropylene films. Among these, a polyester film is preferably used as the substrate layer 11, in terms of good electrolyte resistance. The substrate layer 11 may be a monolayer film made of one of these resin films, or a laminated film made of two or more of these resin films. For example, when a resin film, such as a polyamide film that does not have high electrolyte resistance, is used, a laminated film in which a polyester film or a coat layer made of an acrylic resin, a polyester resin, or the like is further laminated on the outer side (on the slip agent layer 12 side) may be used as the substrate layer 11.

Examples of the stretching method for the stretched film include sequential biaxial stretching, tubular biaxial stretching, and simultaneous biaxial stretching. From the perspective of obtaining better deep drawing formability, the stretched film is preferably stretched using the tubular biaxial stretching method.

The substrate layer 11 preferably has a thickness in the range of 6 to 40 µm and more preferably 10 to 30 µm. When the substrate layer 11 has a thickness of 6 µm or more, pinhole resistance and insulating properties of the packaging material 10 for a power storage device are likely to be improved. If the substrate layer 11 has a thickness of more than 40 µm, the total thickness of the packaging material 10 for a power storage device is increased and the battery electrical capacity may have to be reduced. Therefore, the thickness of this range is not desirable.

(Slip Agent Layer 12)

The slip agent layer contains (a) a fatty acid amide and (b) a fatty acid bisamide. The present embodiment includes both a form in which the slip agent layer 12 continuously covers the entire surface of the substrate layer 11, and a form in which the slip agent layer 12 partially covers the substrate layer 11. For example, in a form in which the fatty acid amide (a) and the fatty acid bisamide (b) each in the form of fine particles are attached onto the substrate layer 11, the entire surface of the substrate layer 11 is not strictly continuously covered without space (i.e., the substrate layer 11 is partially covered); however, the present embodiment also defines this form as constituting the slip agent layer 12.

Examples of the fatty acid amide (a) include erucic acid amide (unsaturated), oleic acid amide (unsaturated), lauric acid amide (saturated), palmitic acid amide (saturated), stearic acid amide (saturated), and various similar amides. Examples of the fatty acid bisamide (b) include ethylene bis-erucic acid amide (unsaturated), ethylene bis-oleic acid amide (unsaturated), methylene bis-stearic acid amide (saturated), ethylene bis-capric acid amide (saturated), ethylene bis-lauric acid amide (saturated), ethylene bis-stearic acid amide (saturated), and various similar bisamides. In the fatty acid amide (a) and the fatty acid bisamide (b), the fatty acids may be saturated fatty acids or unsaturated fatty acids. However, saturated fatty acids having no unsaturated carbon bond are more preferable because they are less likely to be solidified by heat.

According to the inventors' findings, the fatty acid amide (a) is a material necessary for reducing the static friction coefficient of the outermost layer of the packaging material for a power storage device, and necessary for improving the performance of deep drawing. However, fatty acid amides (particularly unsaturated fatty acid amides) are likely to be solidified by heat, and are not preferably used singly. In contrast, the fatty acid bisamide (b) is not considered to contribute to the reduction of the static friction coefficient of the outermost layer of the packaging material for a power storage device; however, since the fatty acid bisamide (b) has a high melting point and is less likely to be solidified by heat, it has the function of better preventing the attachment and solidification of the slip agent to the heat seal bar.

In the present embodiment, the mixing ratio of the fatty acid amide (a) and the fatty acid bisamide (b) is such that the ratio of the fatty acid amide (a) is in the range of 70 to 30 mass %, and the ratio of the fatty acid bisamide (b) is in the range of 30 to 70 mass %, based on the total mass of the fatty acid amide (a) and the fatty acid bisamide (b). Thereby, the effect of improving the performance of deep drawing, and the effect of better preventing the attachment and solidification of the slip agent to the heat seal bar are produced in good balance. If excessive fatty acid amide (a) is used, attachment and solidification of the slip agent to the heat seal bar is likely to occur; whereas if excessive fatty acid bisamide (b) is used, slippage is reduced, and the performance of deep drawing is deteriorated. From such a viewpoint, the mixing ratio of the fatty acid amide (a) and the fatty acid bisamide (b) is preferably such that, based on the total mass of the fatty acid amide (a) and the fatty acid bisamide (b), the ratio of the fatty acid amide (a) is in the range of 70 to 30 mass %, and the ratio of the fatty acid bisamide (b) is in the range of 30 to 70 mass %; and more preferably the ratio of the fatty acid amide (a) is in the range of 70 to 50 mass %, and the ratio of the fatty acid bisamide (b) is in the range of 30 to 50 mass %. The contents of these amides in the slip agent layer can be confirmed by dissolving the constituents of the slip agent layer in a suitable solvent to perform mass analysis, or by dissolving the constituents in a solvent or water for concentration solidification, followed by performing infrared analysis.

The total amount of the fatty acid amide (a) and the fatty acid bisamide (b) contained in the slip agent layer 12 depends on additives mixed in a coating liquid (water dispersion etc.), described later, but is preferably in the range of 60 to 100 mass %, more preferably 80 to 100 mass %, and still more preferably substantially 100 mass % (that is, the slip agent layer 12 is made of the fatty acid amide (a) and the fatty acid bisamide (b)), based on the total mass of the slip agent layer.

The slip agent layer 12 having the above structure functions more effectively when the substrate layer 11 is a polyester film. A nylon film is generally used for the outermost layer of the packaging material for a power storage device. The nylon film contains a fatty acid bisamide as an additive for film formation. Therefore, when the substrate layer is a nylon film, even if a slip agent layer substantially consisting of a fatty acid amide is provided on the outermost layer surface of the outermost layer of the packaging material for a power storage device, the fatty acid bisamide in the nylon film is exuded by bleeding out during heat sealing; thus, the attachment and solidification of the fatty acid amide to the heat seal bar are better prevented. However, even when the nylon film is used, the fatty acid bisamide only relies on exudation by bleeding out; thus, the attachment and solidification of the slip agent to the heat seal bar cannot sufficiently be controlled. Therefore, it is preferred that a slip agent having the above structure is intentionally provided on the outermost layer surface of the packaging material for a power storage device.

In contrast, when the substrate layer 11 is a polyester film, the polyester film does not basically contain a fatty acid bisamide; thus, the slip agent layer 12 containing predetermined amounts of the fatty acid amide (a) and the fatty acid bisamide (b) as described above very suitably functions during forming and heat sealing. The polyester film may be general PET, and particularly preferably an easily-moldable polyester film used for shallow drawing.

(Adhesive Layer 13)

The adhesive layer 13 adheres the substrate layer 11 to the metal foil layer 14. The adhesive layer 13 has an adhesive force required to firmly adhere the substrate layer 11 to the metal foil layer 14 and also has conformability (ability to reliably form the adhesive layer 13 on a member without separation, even when the member is deformed, stretched or contracted) to better prevent breaking of the metal foil layer 14 by the substrate layer 11 during cold forming.

As an adhesive constituting the adhesive layer 13, there can be used a two-part curing type polyurethane adhesive made of, for example, a main resin made of a polyol such as a polyester polyol, a polyether polyol, an acrylic polyol or the like, and a curing agent such as an aromatic or aliphatic isocyanate. In this adhesive, the molar ratio (=NCO/OH) of the isocyanate groups of the curing agent to the hydroxyl groups of the main resin is preferably in the range of 1 to 10, and more preferably 2 to 5.

The polyurethane adhesive, after being applied, is aged, for example, at 40° C. for 4 days or more, during which the reaction between the hydroxyl group of the main agent and the isocyanate group of the curing agent advances, thereby enabling stronger adhesion between the substrate layer 11 and the metal foil layer 14.

The adhesion layer 13 preferably has a thickness in the range of 1 to 10 μm, and more preferably from 2 to 6 μm from the viewpoint of obtaining desired adhesion strength, followability, processability and the like.

(Metal Foil Layer 14)

Examples of the metal foil layer 14 include various types of metal foil such as of aluminum and stainless steel. The metal foil layer 14 is preferably aluminum foil from the viewpoint of moisture resistance, processabilities such as ductility and malleability, and cost. The aluminum foil may be an ordinary soft aluminum foil; however, an aluminum foil containing iron is preferred from the viewpoint of having good pinhole resistance, ductility and malleability.

The aluminum foil containing iron (100 mass %) preferably has an iron content in the range of 0.1 to 9.0 mass %, and more preferably 0.5 to 2.0 mass %. When the iron content is 0.1 mass % or more, a packaging material 10 having better pinhole resistance, ductility and malleability can be obtained. When the iron content is 9.0 mass % or less, a packaging material 10 with better flexibility can be obtained.

From the viewpoint of imparting desired ductility and malleability during forming, an annealed soft aluminum foil (e.g., aluminum foil made of the material 8021 of 8079 according to the Japanese Industrial Standards) is still more preferred as the aluminum foil.

The metal foil used for the metal foil layer 14 is preferably subjected to, for example, degreasing treatment so as to obtain a desired electrolyte resistance. To simplify the production procedure, it is preferred that the metal foil is not etched on the surface thereof. The degreasing treatment includes, for example, a wet degreasing treatment or a dry degreasing treatment. From the viewpoint of simplifying the production procedure, the dry degreasing treatment is preferred.

The dry degreasing treatment includes, for example, a method wherein in the step of subjecting a metal foil to annealing treatment, the degreasing treatment is carried out in such a way that a treatment time is elongated. Sufficient electrolyte resistance may be obtained with the degreasing treatment that is carried out simultaneously with the annealing treatment for softening the aluminum foil.

The dry degreasing treatment may be one, such as flame treatment and corona treatment, that is other than the above annealing treatment. Moreover, the dry degreasing treatment may be one that oxidatively decomposes and removes contaminants using active oxygen generated by irradiating the metal foil with ultraviolet rays at a specific wavelength.

For example, the wet degreasing treatment may be acid degreasing treatment, alkali degreasing treatment, or the like. Examples of the acid used for the acid degreasing treatment include inorganic acids, such as sulfuric acid, nitric acid, hydrochloric acid, and hydrofluoric acid. These acids may be used singly or in combination of two or more. For example, the alkali used in the alkali degreasing treatment may be sodium hydroxide having a high etching effect. The alkaline degreasing treatment may be performed using a material formulated by adding a surfactant or the like to a weakly alkaline material. The wet degreasing treatment set forth above may be performed, for example, by immersion or spraying.

From the perspective of barrier properties, pinhole resistance, and processability, the metal foil layer 14 preferably has a thickness in the range of 9 to 200 μm, more preferably 15 to 150 μm, and still more preferably 15 to 100 μm. The metal foil layer 14 with a thickness of 9 μm or more may be able to make the layer less breakable even when stress is applied thereto by forming. The metal foil layer 14 with a thickness of 200 μm or less may be able to curb the increase in mass of the packaging material and minimize the decrease in weight energy density of the power storage device.

(Anticorrosion Treatment Layers 15*a* and 15*b*)

The anticorrosion treatment layers 15*a* and 15*b* help prevent corrosion of the metal foil layer 14 due to the electrolyte or hydrofluoric acid generated by the reaction between the electrolyte and water. The anticorrosion treatment layer 15*a* also increases the adhesive force between the metal foil layer 14 and the adhesive layer 13. Moreover, the anticorrosion treatment layer 15b increases the adhesive force between the metal foil layer 14 and the sealant adhesive layer 16. The anticorrosion treatment layers 15a and 15b may be identically formed or may be differently formed.

The anticorrosion treatment layers 15a and 15b can be formed by, for example, subjecting a layer, which serves as a base material for the anticorrosion treatment layers 15a and 15b, to degreasing treatment, hydrothermal conversion treatment, anodizing treatment, chemical conversion treatment, or coating-type anticorrosion treatment wherein a coating agent having anticorrosion ability is coated, or a combination of these treatments.

Of the above treatments, degreasing treatment, hydrothermal conversion treatment and anodizing treatment, particularly, hydrothermal conversion treatment and anodizing treatment, are ones wherein the metal foil (aluminum foil) is dissolved with a treatment agent on the surface thereof to form a metal compound (aluminum compound (boehmite, alumite)) having good corrosion resistance. In this sense, such treatments may be embraced within the definition of chemical conversion treatments because they provide a co-continuous structure that is formed covering from the metal foil layer 14 to the anticorrosion treatment layers 15a and 15b.

Examples of the degreasing treatment include acid degreasing treatment and alkaline degreasing treatment. As the acid degreasing, mention is made of a method using acid degreasing with an inorganic acid indicated above, such as sulfuric acid, nitric acid, hydrochloric acid, hydrofluoric acid or the like. These may be used singly or in combination. For the degreasing treatment, use of an acid degreasing agent obtained by dissolving a fluorine-containing compound such as monosodium ammonium difluoride with the aforementioned inorganic acids, in addition to obtaining a degreasing effect of the aluminum foil layer 14, can form a passive state metal fluoride, which is effective in terms of hydrofluoric acid resistance. The alkaline degreasing treatment may be one using sodium hydroxide, or the like.

For example, the hydrothermal conversion treatment may be boehmite treatment using boehmite obtained by immersing the metal foil layer 14 in boiling water with triethanolamine added thereto. For example, the anodizing treatment that can be used may be alumite treatment. Examples of the chemical conversion treatment can be used include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the aforementioned degreasing treatment is preferably performed in advance.

The chemical conversion treatment is not limited to a wet type, but may be a method, for example, in which treatment agents used for these treatments are mixed with a resin component and the mixture is used for coating. The anticorrosion treatment may preferably be of a coating type chromate treatment because it maximizes the anticorrosion effect and is convenient for liquid waste disposal.

The coating agent used in the coating type anticorrosion treatment wherein a coating agent having anticorrosion ability is applied includes one which contains at least one selected from the group consisting of a rare earth element oxide sol, an anionic polymer and a cationic polymer. Especially, a preferred method is one using a coating agent containing a rare earth element oxide sol.

The method using a coating agent containing a rare earth element oxide sol is a pure coating type anticorrosion treatment. When using this method, an anticorrosion effect can be imparted to the metal foil layer 14 even according to ordinary coating methods. The layer formed by use of a rare earth element oxide sol has an anticorrosion effect (inhibitor effect) on the metal foil layer 14 and these sols are favorable materials from an environmental aspect.

The rare earth element oxide sol contains microparticles (e.g., particles having a mean particle size of 100 nm or less) of rare earth element oxide dispersed in a liquid dispersion medium. As the rare earth element oxide, mention can be made of cerium oxide, yttrium oxide, neodymium oxide, lanthanum oxide, or the like. Cerium oxide is preferred among them. This allows further improvement in adhesion with the metal foil layer 14. Examples of the liquid dispersion medium used for the rare earth element oxide sol include various solvents, such as, water, alcoholic solvents, hydrocarbon-based solvents, ketone-based solvents, ester-based solvents, and ether-based solvents. Water is preferred among them. The rare earth element oxides contained in the anticorrosion treatment layers 15a and 15b may be used singly or in combination of two or more.

To stabilize dispersion of the rare earth element oxide particles, the rare earth element oxide sol preferably contains a dispersion stabilizer, including an inorganic acid, such as nitric acid, hydrochloric acid, or phosphoric acid, an organic acid, such as acetic acid, malic acid, ascorbic acid, or lactic acid, a salt of these acids, or the like. Of these dispersion stabilizers, phosphoric acid or phosphate in particular is preferably used. In addition to stabilizing dispersion of the rare earth element oxide particles, use of these materials achieves such effects, in the usage of the packaging material for a lithium ion battery, as improving adhesion to the metal foil layer 14 with the chelating ability of phosphoric acid, imparting electrolyte resistance by trapping metal ions eluted due to the influence of hydrofluoric acid (forming a passive state), improving cohesive force of the rare earth element oxide layer due to the ease of producing dehydration condensation of phosphoric acid even at low temperatures, and the like. Examples of the phosphoric acid or phosphate used as the dispersion stabilizer include orthophosphoric acid, pyrophosphoric acid, metaphosphoric acid, alkali metal salt or ammonium salt thereof, and the like. Of these materials, condensed phosphoric acid, such as trimetaphosphoric acid, tetrametaphosphoric acid, hexametaphosphoric acid, and ultrametaphosphoric acid, or alkali metal salt or ammonium salt thereof is preferred in terms of allowing the packaging material for a lithium ion battery to express its function. In particular, considering the dry film formability (drying capacity, heat capacity) when forming a layer containing rare earth oxide through various types of coating method using a coating composition containing the rare earth element oxide sol, an agent having good reactivity at low temperatures is preferred. Specifically, a sodium salt is preferred because of its good dehydration condensation properties at low temperatures. As the phosphate, a water-soluble salt is preferred. Phosphoric acids or phosphates contained in the anticorrosion treatment layers 15a and 15b may be used singly or in combination of two or more.

In the rare earth element oxide sol, the blending amount of phosphoric acid or salt thereof is preferably 1 part by mass or more, and more preferably 5 parts by mass or more, per 100 parts by mass of the rare earth element oxide. When the blending amount of the phosphoric acid or salt thereof is 1 part by mass or more, not only the soil is well stabilized, but also it is easy to satisfy the function as the packaging material for a lithium ion battery. The upper limit of blending amount of the phosphoric acid or salt thereof per 100 parts by mass of rare earth element oxide may be within a range not lowering the function of the rare earth element oxide sol, and is preferably 100 parts by mass or less, more preferably 50 parts by mass or less, and still more preferably 20 parts by mass or less, per 100 parts by mass of rare earth element oxide.

The layer formed from the rare earth element oxide sol is an aggregate of inorganic particles and therefore the cohesive force of the layer is low even after a dry curing step. To compensate the cohesive force of this layer, complexing with an anionic polymer is favorable.

The anionic polymer includes a polymer having a carboxyl group, and includes, for example, poly(meth)acrylic acid (or its salt), or a copolymer obtained by copolymerizing poly(meth)acrylic acid as a main component. Examples of the copolymerization component of the copolymers include: alkyl(meth)acrylate-based monomers (of which examples of alkyl groups include a methyl group, an ethyl group, an n-propyl group, an i-propyl group, an n-butyl group, an i-butyl group, a t-butyl group, a 2-ethylhexyl group, and a cyclohexyl group); amide group-containing monomers, such as (meth)acrylamide, N-alkyl(meth)acrylamide, N,N-dialkyl(meth)acrylamide (of which examples of alkyl groups include a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy(meth)acrylamide (of which examples of alkoxy groups include a methoxy group, an ethoxy group, a butoxy group, and an isobutoxy group), N-methylol(meth)acrylamide, and N-phenyl(meth)acrylamide; hydroxyl group-containing monomers, such as 2-hydroxyethyl(meth)acrylate and 2-hydroxypropyl(meth)acrylate; glycidyl group-containing monomers, such as glycidyl(meth)acrylate and allyl glycidyl ether; silane-containing monomers, such as (meth)acryloxypropyl trimethoxysilane and (meth)acryloxypropyl triethoxysilane; and isocyanate group-containing monomers, such as (meth)acryloxypropyl isocyanate. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth)acrylonitrile, vinylidene chloride, ethylene, propylene, vinyl chloride, vinyl acetate, and butadiene.

The anionic polymer improves the stability of the anticorrosion treatment layers 15a and 15b (oxide layers) obtained using the rare earth element oxide sol. This improvement is achieved by the effect of protecting the hard and brittle oxide layers with an acrylic resin component, and also by the effect of capturing ionic contamination (particularly, sodium ion) derived from the phosphate contained in the rare earth oxide sol (cation catcher). In other words, when alkali metal ion or alkaline earth metal ion, such as sodium in particular, is contained in the anticorrosion treatment layers 15a and 15b obtained by use of the rare earth element oxide sol, the anticorrosion treatment layers 15a and 15b are prone to deteriorate starting from the ion-containing site. Accordingly, sodium ion or the like contained in the rare earth oxide sol is immobilized by use of the anionic polymer to thereby improve durability of the anticorrosion treatment layers 15a and 15b.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal foil layer 14. The anionic polymer preferably has a structure where a substantially water-soluble polyanionic polymer is cross-linked. Examples of the cross-linking agent used in the formation of this structure include a compound having an isocyanate group, a glycidyl group, a carboxy group, or an oxazoline group. Moreover, it is possible to introduce cross-linking site having a siloxane bond by use of a silane coupling agent.

Examples of the compound having an isocyanate group include: diisocyanates such as tolylene diisocyanate, xylylene diisocyanate or its hydrogenated product, hexamethylene diisocyanate, 4,4'-diphenylmethane diisocyanate or its hydrogenated product, and isophorone diisocyanate; polyisocyanates including adducts of these isocyanates reacted with polyhydric alcohols such as trimethylolpropane, biuret forms obtained by reaction of the isocyanates with water, or isocyanurate forms that are trimers of the isocyanates; or blocked polyisocyanates obtained by blocking these polyisocyanates with alcohols, lactams, oximes and the like.

Examples of the compound having a glycidyl group include: epoxy compounds obtained by reaction of glycols, such as ethylene glycol, diethylene glycol, triethylene glycol, polyethylene glycol, propylene glycol, dipropylene glycol, tripropylene glycol, polypropylene glycol, 1,4-butadiene, 1,6-hexanediol, and neopentyl glycol, with epichlorohydrin; epoxy compounds obtained by reaction of polyhydric alcohols, such as glycerine, polyglycerine, trimethylolpropane, pentaerythritol, and sorbitol, with epichlorohydrin; and epoxy compounds obtained by reaction of dicarboxylic acids, such as phthalic acid, terephthalic acid, oxalic acid, and adipic acid, with epichlorohydrin.

The compounds having a carboxy group include various aliphatic or aromatic dicarboxylic acids, and include, further, poly(meth)acrylic acids, or alkali (earth) metal salts of poly(meth)acrylic acids.

The compounds having an oxazoline group include, for example, low molecular weight compounds having two or more oxazoline units. Alternatively, where polymerizable monomers such as isopropenyl oxazoline are used, mention may be made of compounds obtained by copolymerizing acrylic monomers such as (meth)acrylic acid, (meth)acrylic alkyl esters, hydroxyalkyl(meth)acrylates and the like.

The silane coupling agents include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropylethoxysilane. Especially, when the reactivity with an anionic polymer is considered, an epoxysilane, an aminosilane and an isocyanate silane are preferred.

The blending amount of cross-linking agent is preferably in the range of 1 to 50 parts by mass, and more preferably 10 to 20 parts by mass, per 100 parts by mass of the anionic polymer. When the ratio of the cross-linking agent is 1 part by mass or more relative to 100 parts by mass of the anionic polymer, a cross-linking structure is likely to be sufficiently formed. When the ratio of the cross-linking agent is 50 parts by mass or less per 100 parts by mass of the anionic polymer, the pot life of the coating agent improves.

The method of cross-linking the anionic polymer is not limited to the use of the aforementioned cross-linking agents, but may be one using a titanium or zirconium compound to form ionic crosslinkage. The coating composition forming the anticorrosion treatment layer 15a may be applied to these materials.

The anticorrosion treatment layers 15a and 15b described above are formed as chemical conversion treatment layers on the metal foil layer 14 using chemical conversion treatment, typical of which is chromate treatment. To form a graded structure in association with the metal foil layer 14, the metal foil layer 14 is treated, in the chemical conversion treatment, with a chemical conversion treatment agent, which is particularly formulated with addition of hydrofluoric acid, hydrochloric acid, nitric acid, sulfuric acid or a salt thereof. The treated metal foil layer 14 is then reacted with a chromium or non-chromium compound to form the chemical conversion treatment layers on the metal foil layer 14. However, the chemical conversion treatment using the acid as the chemical conversion treatment agent may entail environmental degradation and corrosion of the coating apparatus.

In contrast, the anticorrosion treatment layers 15a and 15b of the coating type as mentioned above do not have to form an inclined structure with respect to the metal foil layer 14, unlike in the chemical conversion treatment typical of which is chromate treatment. Accordingly, the nature of the coating agent should not be restricted to acidity, alkalinity, neutrality, or the like, and accordingly a good work environment is achieved. In addition, an alternative to chromate treatment using a chromium compound is sought in terms of environmental health. From this perspective as well, the anticorrosion treatment layers 15a and 15b of coating type are preferred.

The anticorrosion treatment layers 15a and 15b may have a laminated structure in which a cationic polymer is further laminated as needed. The cationic polymer may be polyethyleneimine, an ionic polymer complex made of a polyethyleneimine and a polymer having carboxylic acid, a primary amine-grafted acrylic resin having a primary amine grafted to a main acrylic backbone, polyallylamine and derivatives thereof, or an aminophenol resin.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. Examples of the ionic salt include an alkali metal salt, and alkaline earth metal.

The primary amine-grafted acrylic resin is a resin having a primary amine grafted to a main acrylic backbone. The acrylic main backbone includes various monomers, such as poly(meth)acrylic acid, used for the acrylic polyol mentioned above. The primary amine grafted to the acrylic main backbone may be ethyleneimine or the like.

Usable polyallylamines or derivatives thereof include a homopolymer or a copolymer of allylamine, allylamine amide sulfate, diallylamine, dimethylallylamine, and the like. These amines may be used in the form of free amine, or may be stabilized by acetic acid or hydrochloric acid. Usable copolymer components include maleic acid, sulfur dioxide, or the like. A type of amine imparted with thermal cross-linking properties by partially methoxylating a primary amine may be used. These cationic polymers may be used singly or in combination of two or more. Of these cationic polymers, at least one selected from the group consisting of polyallylamine and a derivative thereof is preferred.

The cationic polymer is preferably used in combination with a cross-linking agent having a functional group capable of reacting with amine/imine, such as a carboxy group or a glycidyl group. The cross-linking agent to be used in combination with the cationic polymer may be a polymer having carboxylic acid that forms an ionic polymer complex with polyethyleneimine, of which examples include: polycarboxylic acid (salt), such as polyacrylic acid or ionic salt thereof; a copolymer produced by introducing a comonomer thereinto; and polysaccharides having a carboxy group, such as carboxymethylcellulose or ionic salt thereof.

In the present embodiment, a cationic polymer is described as a component constituting the anticorrosion treatment layers 15a and 15b. The reason for this is that intensive studies have been made on a variety of compounds so as to impart electrolyte resistance and hydrofluoric acid resistance, which are required for a packaging material for a lithium ion battery. As a result, cationic polymers have been found to be compounds that are capable of imparting electrolyte resistance and hydrofluoric acid resistance. This is believed to be because damage to the metal foil layer 14 is more suppressed and reduced by capturing fluoride ion with the cationic group (anion catcher). The cationic polymer is also preferred from the perspective of improving adhesion between the anticorrosion treatment layer 15b and the sealant adhesive layer 16. Since the polymers are water soluble similar to the anionic polymers mentioned above, water resistance can be improved by forming a cross-linking structure by using the cross-linking agent mentioned above. Thus, the cross-linking structure can also be formed by using the cationic polymer. Accordingly, when the rare earth oxide sol is used for forming the anticorrosion treatment layers 15a and 15b, a cationic polymer may be used as the protective layer instead of an anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+ anionic polymer: laminated composite)/cationic polymer (multilayer), (7) (rare earth oxide sol+cationic polymer: laminated composite)/anionic polymer (multilayer), and the like. Of these combinations, (1) and (4) to (7) are preferable, and (4) to (7) are more preferable. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to maintain the sealant layer 17 side electrolyte resistance. However, the present embodiment is not limited to the above combinations. An example of selecting the anticorrosion treatment is as follows. Specifically, when the sealant adhesive layer 16 is formed of a modified polyolefin resin, the cationic polymer is designed to be provided on the surface contacting the sealant adhesive layer 16 (e.g., configurations (5) and (6)) since the cationic polymer is a material quite preferable in terms of good adhesion with a modified polyolefin resin that will be mentioned in the sealant adhesive layer 16 below.

The anticorrosion treatment layers 15a and 15b are not limited to the layers described above. For example, they may be formed by using an agent produced by blending phosphoric acid and a chromium compound into a resin binder (aminophenol resin etc.), as in a coating type chromate based on a known technique. Use of such a treatment agent enables formation of a layer that has both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer obtained in advance.

The anticorrosion treatment layers 15a and 15b preferably have mass per unit area in the range of 0.005 to 0.200 $g/m^2$, and more preferably 0.010 to 0.100 $g/m^2$. When 0.005 $g/m^2$ or more, the metal foil layer 14 can be easily made corrosion-resistant. The mass per unit area exceeding 0.200 $g/m^2$ will saturate the anticorrosivity and make little change therein. In contrast, when the rare earth oxide sol is used, a thick coating may cause insufficient thermal curing during drying and decrease the cohesive force. Although the above description is given using mass per unit area, the specific gravity, if available, can be used in terms of thickness.

The respective thicknesses of the anticorrosion treatment layers 15a and 15b are preferably, for example, in the range of 10 nm to 5 μm, and more preferably 20 to 500 nm, from the perspective of corrosion-resistant and anchoring functions.

In the packaging material 10 according to the present embodiment, it is preferred that the anticorrosion treatment layers 15a and 15b are formed by treatment using cerium oxide to improve the adhesion between the substrate layer 11 and the metal foil layer 14.

(Sealant Adhesive Layer 16)

The sealant adhesive layer 16 adheres the sealant layer 17 to the metal foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily better prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may be a copolymer obtained by copolymerizing polar molecules such as of acrylic acid or methacrylic acid with those materials mentioned above, a polymer such as cross-linked polyolefin, or the like. The acid modifying the polyolefin-based resin may be a carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the aforementioned adhesive component with an extruder. The sealant adhesive layer 16 of the heat lamination structure preferably has a thickness in the range of 8 to 50 μm.

The adhesive component forming the sealant adhesive layer 16 of the dry lamination structure may be ones, for example, similar to those mentioned for the adhesive layer 13. In this case, to better prevent or more reduce swelling due to the electrolyte, and hydrolysis due to hydrofluoric acid, the composition of the adhesive is preferably designed so as to contain a main resin with a backbone not easily hydrolyzed and to improve cross-linking density.

To improve cross-linking density, some substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid is obtained by dimerizing various unsaturated fatty acids, and can have a structure, for example, of an acyclic type, monocyclic type, polycyclic type, and aromatic ring type.

The fatty acid as a starter of the dimer fatty acid is not particularly limited. When using such a dimer fatty acid as an essential component, a dibasic acid as used for ordinary polyester polyol may be introduced thereto. The curing agent that can be used for the main resin forming the sealant adhesive layer 16 may be, for example, an isocyanate compound that may also be used as a chain elongation agent for polyester polyol. Thus, cross-linking density of the adhesive coating increases, which leads to improving solubility and swelling properties. Also, substrate adhesion is also expected to be improved due to increase in urethane group concentration.

The sealant adhesive layer 16 having the dry laminate structure has a bonding part such as of an ester group and a urethane group which is easily hydrolysable. Therefore, for usage requiring much higher reliability, an adhesive component having a heat lamination structure is preferably used as the sealant adhesive layer 16. For example, the various curing agents mentioned above are blended into a coating agent wherein the acid modified polyolefin resin is dissolved or dispersed in a solvent, such as toluene or methylcyclohexane (MCH), followed by application and drying to thereby form the sealant adhesive layer 16.

When forming the sealant adhesive layer 16 using extrusion molding, the adhesion resin tends to be oriented in MD (extrusion direction) due to the stress or the like generated during the extrusion molding. In this case, to alleviate the anisotropy of the sealant adhesive layer 16, an elastomer may be blended into the sealant adhesive layer 16. As the elastomer to be blended into the sealant adhesive layer 16, for example, an olefin-based elastomer, a styrene-based elastomer, or the like may be used.

The elastomer preferably has a mean particle size that can improve the compatibility of the elastomer with the adhesive resin and improve the effect of alleviating the anisotropy of the sealant adhesive layer 16. Specifically, the mean particle size of the elastomer is preferably 200 nm or less, for example.

The mean particle size of the elastomer is determined by, for example, capturing an enlarged image of a cross section of an elastomer composition using an electron microscope, followed by image analysis for the measurement of a mean particle size of dispersed cross-linked rubber components. The elastomers mentioned above may be used singly or in combination of two or more.

If an elastomer is blended into the sealant adhesive layer 16, the blending amount of the elastomer added to the sealant adhesive layer 16 (100 mass %) is, for example, preferably in the range of 1 to 25 mass % and more preferably 10 to 20 mass %. When the blending amount of the elastomer is 1 mass % or more, improvement is likely to be achieved in compatibility with the adhesion resin, and also in the effect of alleviating the anisotropy of the sealant adhesive layer 16. When the blending amount of the elastomer is 25 mass % or less, improvement is likely to be achieved in the effect of better preventing or better reducing swelling of the sealant adhesive layer 16 due to the electrolyte.

The sealant adhesive layer 16 may be, for example, a dispersed adhesive resin solution in which an adhesive resin is dispersed in an organic solvent.

The sealant adhesive layer 16 when provided to the heat lamination structure preferably has a thickness in the range of 8 μm or more and 50 μm or less, and more preferably 20 μm or more and 40 μm or less. The sealant adhesive layer 16 having a thickness of 8 μm or more can easily obtain sufficient adhesion strength between the metal foil layer 14 and the sealant layer 17. The sealant adhesive layer 16 having a thickness of 50 μm or less can more easily reduce the amount of water penetrating from an end surface of the packaging material into the battery element in the interior. The sealant adhesive layer 16 when provided to the dry lamination structure preferably has a thickness in the range of 1 μm or more and 5 μm or less. The sealant adhesive layer 16 having a thickness of 1 μm or more can easily obtain sufficient adhesion strength between the metal foil layer 14 and the sealant layer 17. The sealant adhesive layer 16 having a thickness of 5 μm or less is capable of better preventing or more reducing cracking therein.

(Sealant Layer 17)

The sealant layer 17 imparts sealability to the packaging material 10 when heat sealed, and is located on the inward side for heat sealing when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin that improves the barrier properties against water vapor and is capable of forming the shape of the power storage device without being excessively deformed by heat sealing is preferred, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

Some substance may be added to the above types of polypropylenes, that is, random polypropylene, homo polypropylene, and block polypropylene, the substance being a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, a slip agent, such as a fatty acid amide, or the like.

The acid-modified polyolefin-based resin includes, for example, those resins which are similar to ones mentioned in the sealant adhesive layer 16.

The sealant layer 17 may be a single layer film or may be a multilayer film, which may be selected according to the required ability. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

A heat sealable film formed by extrusion may be used as the sealant layer 17. In this case, the orientation of the sealable film tends to conform to the direction of its extrusion. Therefore, from the perspective of alleviating the anisotropy of the sealant layer 17 due to the orientation, an elastomer may be blended into the heat sealable film. Blending an elastomer, blushing of the sealant layer 17 is better prevented or more reduced when the packaging material 10 for a power storage device is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the multilayer film structure may be configured to contain the elastomer. For example, when the sealant layer 17 has a three-layer laminated structure of random polypropylene layer/block polypropylene layer/random polypropylene layer, the elastomer may be blended into only the block polypropylene layer or only in the random polypropylene layers, or may be blended into both the random polypropylene layers and the block polypropylene layer.

The sealant layer 17 may contain a lubricant to impart lubricity thereto. Then, a recess is formed in the packaging material 10 for a power storage device by cold forming, the sealant layer 17 containing a lubricant can help prevent the packaging material 10 from being stretched more than necessary in the areas to be shaped into side portions and corners of the recess where the stretching degree is high. This can better prevent separation between the metal foil layer 14 and the sealant adhesive layer 16, or better prevent breaking and blushing due to cracks in the sealant layer 17 and the sealant adhesive layer 16.

When the sealant layer 17 contains a lubricant, the content in the sealant layer 17 (100 mass %) is preferably in the range of 0.001 mass % to 0.5 mass %. When the content of lubricant is 0.001 mass % or more, blushing of the sealant layer 17 is likely to be further reduced during cold forming. When the content of lubricant is 0.5 mass % or less, lowering in adhesion strength is likely to be minimized with respect to a surface of another layer contacting a surface of the sealant layer 17.

The sealant layer 17 preferably has a thickness in the range of 10 to 100 μm, and more preferably 20 to 60 μm. The sealant layer 17 with a thickness of 20 μm or more achieves sufficient heat sealing strength. The sealant layer 17 with a thickness of 90 μm or less reduces the amount of water vapor penetration from an end of the packaging material.

[Method of Producing Packaging Material]

A method of producing the packaging material 10 will be described. The method of producing the packaging material 10 is not limited to the following method.

For example, the method of producing the packaging material 10 may be a method including the following steps S11 to S14.

Step S11: Forming the anticorrosion treatment layer 15a on a surface of a metal foil layer 14 and forming the corrosion inhibition treatment layer 15b on the other surface of the metal foil layer 14.

Step S12: Bonding a surface of the anticorrosion treatment layer 15a on a side opposite to the metal foil layer 14 to the substrate layer 11 via the adhesive layer 13.

Step S13: Forming the sealant layer 17 on a surface of the anticorrosion treatment layer 15b on a side opposite to the metal foil layer 14 with the sealant adhesive layer 16 interposed therebetween.

Step S14: Forming the slip agent layer 12 on a surface of the substrate layer 11 on a side opposite to the adhesive layer 13.

(Step S11)

At step S11, the anticorrosion treatment layer 15a is formed on a surface of the metal foil layer 14 and the anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, followed by drying, curing, and baking sequentially to simultaneously form the anticorrosion treatment layers 15a and 15b. Alternatively, an anticorrosion treatment agent may be applied to a surface of the metal foil layer 14, sequentially followed by drying, curing, and baking to form the anticorrosion treatment layer 15a. Then, the anticorrosion treatment layer 15b may be similarly formed on the other surface of the metal foil layer 14. The order of forming the anticorrosion treatment layers 15a and 15b is not particularly limited. The anticorrosion treatment agent to be used may be different or the same between the anticorrosion treatment layers 15a and 15b. As the anticorrosion treatment agent, for example, one for coating type chromate treatment, or the like may be used. Examples of the method of applying the anticorrosion treatment include, but are not particularly limited to, gravure coating, gravure reverse coating, roll coating, reverse roll coating, die coating, bar coating, kiss coating, and comma coating. As the metal foil layer 14, an untreated metal foil layer may be used, or a metal foil layer subjected to wet or dry degreasing treatment may be used.

(Step S12)

At step S12, a surface of the anticorrosion treatment layer 15a on a side opposite to the metal foil layer 14 is bonded to the substrate layer 11 by dry lamination or the like using an adhesive forming the adhesive layer 13. At step S12, aging treatment may be performed at a temperature in the range of room temperature to 100° C. to accelerate adhesion. Aging time is, for example, 1 to 10 days.

(Step S13)

Following step S12, the sealant layer 17 is formed on a surface of the anticorrosion treatment layer 15b on a side opposite to the metal foil layer 14 with the sealant adhesive layer 16 interposed therebetween, in the laminate having the substrate layer 11, the adhesive layer 13, the anticorrosion treatment layer 15a, the metal foil layer 14, and the anticorrosion treatment layer 15b laminated in this order. The sealant layer 17 may be laminated by dry lamination, sandwich lamination, or the like, or may be laminated together with the sealant adhesive layer 16 by coextrusion. To improve adhesion, the sealant layer 17 is preferably laminated by, for example, sandwich lamination or laminated together with the sealant adhesive layer 16 by coextrusion, and is more preferably laminated by sandwich lamination.

(Step S14)

Following step S13, the slip agent layer 12 is formed on a surface of the substrate layer 11 on a side opposite to the adhesive layer 13, in the laminate having the substrate layer 11, the adhesive layer 13, the anticorrosion treatment layer 15a, the metal foil layer 14, the anticorrosion treatment layer 15b, the sealant adhesive layer 16, and the sealant layer 17 laminated in this order. In the present embodiment, the slip agent layer 12 contains a fatty acid amide (a) and a fatty acid bisamide (b), as described above. Since an unsaturated fatty acid amide is typically soluble in solvents, it can be applied after being dissolved in various solvents; however, as for a fatty acid bisamide, which is hardly dissolved in solvents, it can be applied to the slip agent layer 12 using a water dispersion. When both amides are applied to the slip agent layer 12, for example, an unsaturated fatty acid amide, which is soluble in solvents, is firstly applied thereto, and a water dispersion of a fatty acid bisamide is then applied thereto. However, the order of application may be reversed.

Such a method is not efficient because it is necessary to separately apply coating agents of different systems, i.e., a solvent-based coating agent and a water-based coating agent. Therefore, when a saturated fatty acid amide is used in the form of a water dispersion as the fatty acid amide (a), the amide materials having different functions can be applied at once using a water-based coating liquid for forming a slip agent layer. When this coating liquid is applied to a plastic substrate, various additives, such as a leveling agent and an antifoaming agent, can be further blended.

The coating amount (solid content) of the coating liquid for forming a slip agent layer is preferably in the range of 3 to 10 mg/m$^2$, and more preferably 4 to 6 mg/m$^2$. If the coating amount is excessively small, the performance of deep drawing is reduced, whereas if the coating amount is excessively large, attachment and solidification of the slip agent to the heat seal bar during sealing may easily occur even in the packaging material for a power storage device of the present embodiment. The solid content as mentioned herein may preferably be regarded as the content (coating amount) of the fatty acid amide and the fatty acid bisamide in the slip agent layer 12.

After the application of the coating liquid for forming a slip agent layer, followed by drying treatment is performed at 70 to 100° C. for 1 to 6 seconds, the slip agent layer can be formed.

The packaging material 10 is obtained through the steps S11 to S14 described above. The order of steps in the method of producing the packaging material 10 is not limited to the sequence of steps S11 to S14. The order of steps may be appropriately changed. For example, step S14 may be followed by step S13.

[Power Storage Device]

A power storage device provided with the packaging material 10 as a container will be described. The power storage device includes: a battery element 1 including electrodes; leads 2 extending from the electrodes; and a container holding the battery element 1. The container is formed of the packaging material 10 for a power storage device, with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The power storage device may have the packaging material 20 as a container. Examples of the power storage device include secondary batteries, such as lithium ion batteries, nickel hydride batteries, and lead batteries, and electrochemical capacitors, such as electric double layer capacitors.

The leads 2 are sandwiched and hermetically sealed by the packaging material 10 forming the container with the sealant layer 17 inside. The leads 2 may be sandwiched by the packaging material 10 with a tab sealant interposed therebetween.

[Method of Producing Power Storage Device]

Figure 2A:
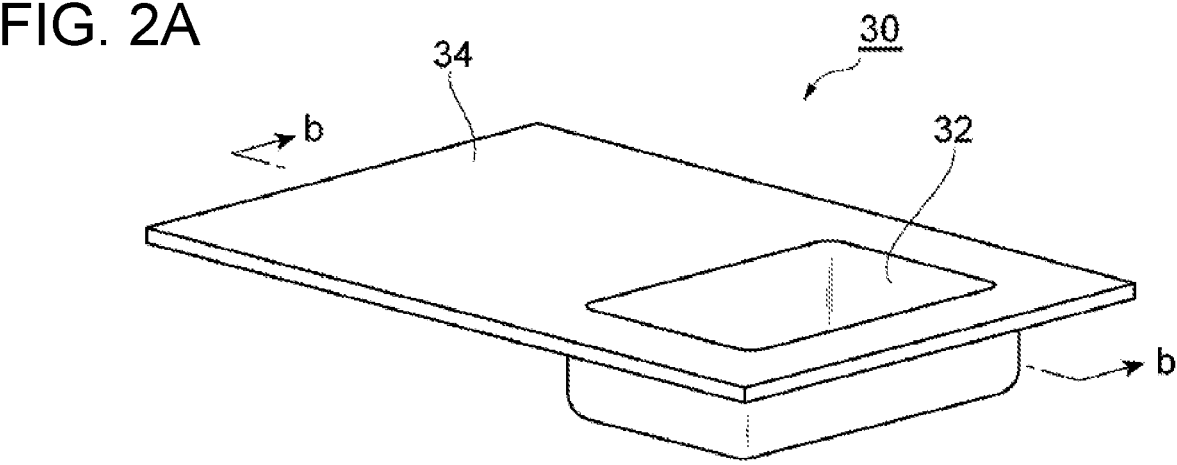
FIGS. 2A and 2B are a set of diagrams illustrating an embossed packaging material obtained using the power storage device packaging material according to an embodiment of the present invention, with FIG. 2A being a perspective view of the embossed packaging material, and FIG. 2B being a vertical cross-sectional view of the embossed packaging material shown in FIG. 2A taken along the line b-b.
Figure 2B:
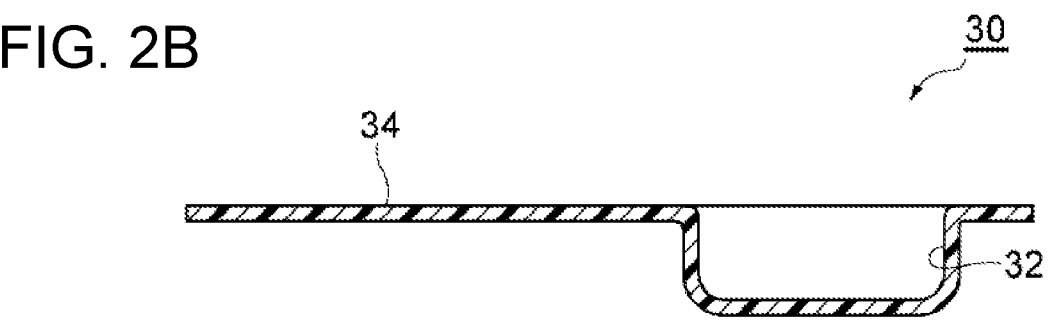

A method for producing the power storage device using the packaging material 10 will be described. The description herein is given taking as an example of the case of producing a secondary battery 40 using an embossed packaging material 30. FIGS. 2A and 2B show a set of diagrams each illustrating the embossed packaging material 30. FIGS. 3A, 3B, 3C, and 3D show a set of diagrams, each being a perspective view of a production procedure of a single-sided battery using the packaging material 10. The secondary battery 40 may be a double-sided battery produced by providing two packaging materials similar to the embossed packaging material 30, and bonding the packaging materials to each other while alignment is adjusted. The embossed packaging material 30 may be formed using a packaging material 20.

The secondary battery 40, which is a single-sided battery, can be produced through steps S21 to S25 below, for example.

Step S21: Preparing the packaging material 10, the battery element 1 including electrodes, and the leads 2 extending from the electrodes.

Step S22: Forming a recess 32 for disposing the battery element 1 therein on a surface of the packaging material 10 (see FIG. 3A and FIG. 3B).

Figure 3A:
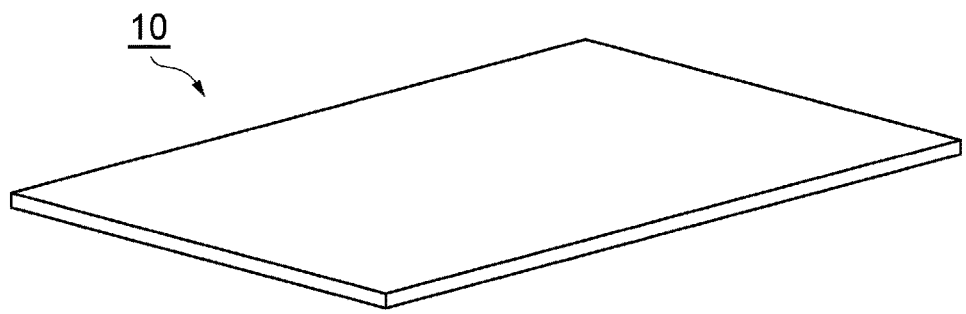
FIGS. 3A, 3B, 3C, and 3D are a set of perspective views illustrating a process of producing a secondary battery using the power storage device packaging material according to an embodiment of the present invention, with FIG. 3A showing the power storage device packaging material, FIG. 3B showing the power storage device packaging material that has been embossed, and a battery element, FIG. 3C showing the power storage device packaging material that has been folded with an end portion being heat-sealed, and FIG. 3D showing a state in which both sides of the folded portion are turned up.
Figure 3B:
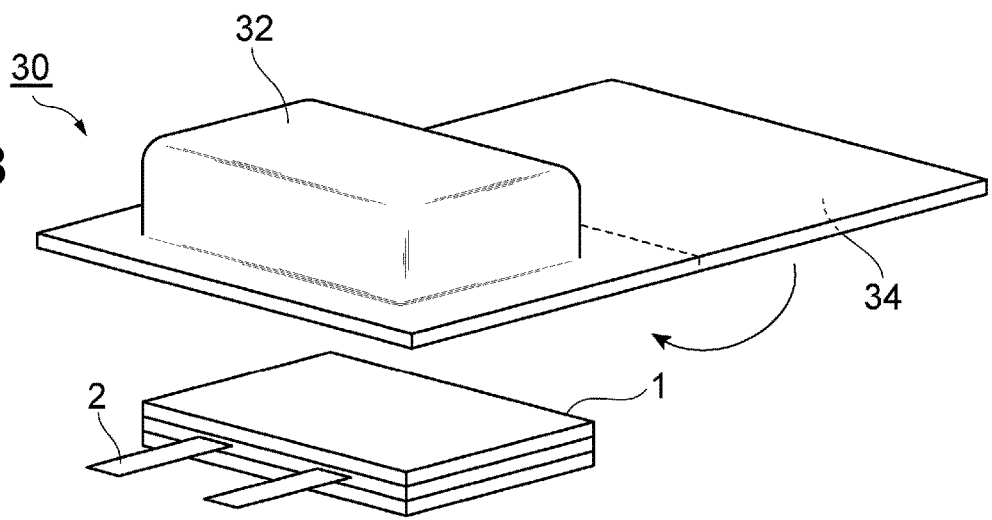
Figure 3C:
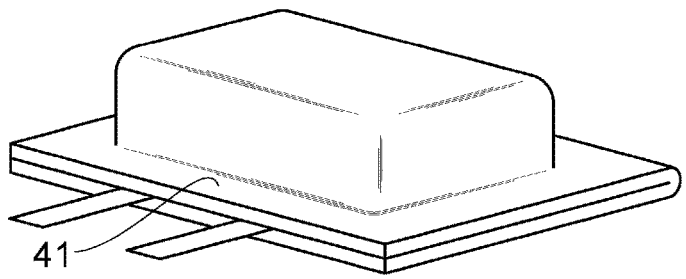
Figure 3D:
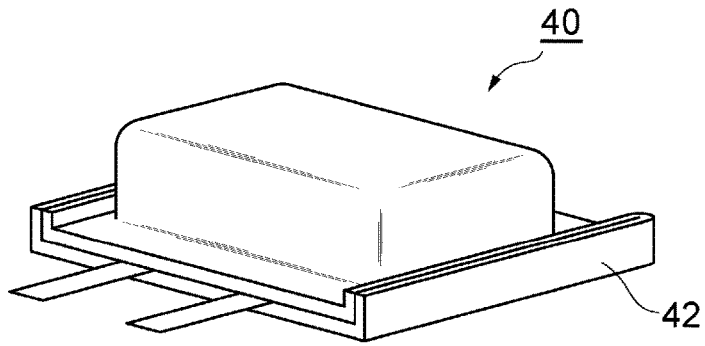

Step S23: Disposing the battery element 1 in the shaped area (recess 32) of the embossed packaging material 30, folding the embossed packaging material 30, with the surfaces being overlapped, so as to cover the recess 32 with a cover portion 34, and pressure heat-sealing one side of the embossed packaging material 30 so as to sandwich the leads 2 extending from the battery element 1 (FIG. 3B and FIG. 3C).

Step S24: Pressure heat-sealing other sides, leaving the side sandwiching the leads 2 unsealed, followed by injecting an electrolyte from the unsealed side and pressure heat-sealing the unsealed side in a vacuum (see FIG. 3C).

Step S25: Trimming the end portions of the pressure heat-sealed sides except for the side sandwiching the leads 2, and bending the end portions toward the shaped area (recess 32) (see FIG. 3D).

(Step S21)

At step S21, the packaging material 10, the battery element 1 including electrodes, and the leads 2 extending from the electrodes are prepared. The packaging material 10 is prepared based on the embodiment described above. The battery element 1 and the leads 2 are not particularly limited, but a known battery element 1 and known leads 2 may be used.

(Step S22)

At step S22, the recess 32 for arranging the battery element 1 is formed on the sealant layer 17 side of the packaging material 10. The recess 32 has a shape, such as a rectangular shape in plan view, conforming to the shape of the battery element 1. The recess 32 is formed by, for example, pressing a pressing member having a rectangular pressing surface against part of the packaging material 10 in the thickness direction thereof. The position to be pressed, that is, the recess 32, is formed in a position deviated to an end portion of the packaging material 10 in a longitudinal direction from the center of the packaging material 10 cut in a rectangle. Thus, the other end portion having no recess 32 is folded after forming to provide a cover (cover portion 34).

More specifically, the method of forming the recess 32 may be a method using a die (deep drawing). The molding method may be one that uses a negative die and a positive die arranged with a gap equal to or greater than the thickness of the packaging material 10 therebetween, so that the positive die is pressed into the negative die together with the packaging material 10. By adjusting the pressing force of the positive die, the depth (deep drawing degree) of the recess 32 can be adjusted as desired. With the recess 32 being formed in the packaging material 10, the embossed packaging material 30 is obtained. The embossed packaging material 30 has a shape, for example, as illustrated in FIGS. 2A and 2B. FIG. 2A shows a perspective view of the embossed packaging material 30, and FIG. 2B is a longitudinal cross-sectional view of the embossed packaging material 30 shown in FIG. 2A taken along the line b-b.

(Step S23)

At step S23, the battery element 1 including a cathode, a separator, an anode, and the like is arranged in the shaped area (recess 32) of the embossed packaging material 30. The leads 2 extending from the battery element 1 and respectively joined to the cathode and the anode are drawn out of the molding area (recess 32). The embossed packaging material 30 is then folded at the approximate center thereof in the longitudinal direction so that the surfaces of the sealant layer 17 are located on the inward side and overlapped with each other, followed by pressure heat-sealing the side of the embossed packaging material 30 sandwiching the leads 2. The pressure heat sealing is controlled by three conditions of temperature, pressure, and time, which are appropriately set. The pressure heat sealing is preferably performed at a temperature of not less than the temperature of fusing the sealant layer 17.

The thickness of the sealant layer 17 before being heat-sealed is preferably in the range of 40% or more and 80% or less relative to the thickness of the leads 2. With the thickness of the sealant layer 17 being not less than the lower limit, the heat-sealing resin is likely to sufficiently fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving the side sandwiching the leads 2 unsealed. An electrolyte is then injected from the unsealed side which is then pressure heat-sealed in vacuum. The pressure heat-sealing conditions are similar to those at step S23.

(Step S25)

The end portions of the pressure heat-sealed sides except for the side sandwiching the leads 2 are trimmed and the sealant layer 17 squeezed out of the end portions is removed. The peripheral pressure heat-sealed portions are then turned up toward the shaped area (recess) 32 to form turn-up portions 42, thereby obtaining the secondary battery 40.

Second Embodiment

[Packaging Material for Power Storage Device]

The packaging material (packaging material for power storage device) 10 of the present embodiment includes at least a slip agent layer, a substrate layer, an adhesive layer, a metal foil layer, a sealant adhesive layer, and a sealant layer in this order, as with the first embodiment.

(Substrate Layer 11)

The description in the first embodiment is applied mutatis mutandis to the description of the substrate layer 11, except for the following points. That is, in the present embodiment, a nylon film may be particularly used as the substrate layer 11. Since a nylon film generally contains a fatty acid bisamide for film formation as an additive, the fatty acid bisamide in the nylon film is exuded by bleeding out during heat sealing. In the present embodiment in which a fatty acid bisamide is not an essential structure in the slip agent layer 12, described later. In such a case, by adding a small amount of fatty acid bisamide to the fatty acid amide, as described above, attachment and solidification of the fatty acid amide to the heat seal bar is easily better prevented.

(Slip Agent Layer 12)

The slip agent layer 12 contains a fatty acid amide and silicone oil. The present embodiment includes both a form in which the slip agent layer 12 continuously covers the entire surface of the substrate layer 11, and a form in which the slip agent layer 12 partially covers the substrate layer 11. For example, in a form in which the constituents of the slip agent layer 12 each in the form of fine particles are attached onto the substrate layer 11, the entire surface of the substrate layer 11 is not strictly continuously covered without space (i.e., the substrate layer 11 is partially covered); however, the present embodiment also defines this form as constituting the slip agent layer 12.

Examples of the fatty acid amide include erucic acid amide (unsaturated), oleic acid amide (unsaturated), lauric acid amide (saturated), palmitic acid amide (saturated), stearic acid amide (saturated), and like various amides. In the fatty acid amide, the fatty acids may be saturated fatty acids or unsaturated fatty acids. However, saturated fatty acids having no unsaturated carbon bond are more preferable because they are less likely to be solidified by heat. In place of fatty acid amides, or in addition to fatty acid amides, it is also possible to use fatty acid bisamides, such as ethylene bis-erucic acid amide (unsaturated), ethylene bis-oleic acid amide (unsaturated), methylene bis-stearic acid amide (saturated), ethylene bis-capric acid amide (saturated), ethylene bis-lauric acid amide (saturated), and ethylene bis-stearic acid amide (saturated). However, fatty acid amides are preferable in terms of reducing the static friction coefficient and dynamic friction coefficient, as required for suitable formability.

The content (coating amount) of the fatty acid amide in the slip agent layer 12 is in the range of 3 to 10 mg/m$^2$, and preferably 4 to 6 mg/m$^2$. When the fatty acid amide has a content of 3 mg/m$^2$ or more, the effect of improving the performance of deep drawing can be obtained; whereas when the fatty acid amide has a content of 10 mg/m$^2$ or less, the attachment of the fatty acid amide to the seal bar and the influence of burning can be suppressed in the heat sealing process. The fatty acid amide content can be measured by GC-MS, for example.

Polydimethylsiloxane and various types of modified polydimethylsiloxane (modified silicone oil) can be generally used as the silicone oil. Specific examples thereof include dimethyl silicone oil, methylphenyl silicone oil, methyl hydrogen silicone oil, and the like. However, organic groups (including H) introduced into modified silicone oil are not particularly limited, and organic groups may be introduced into side chains or terminals.

The content of silicone oil in the slip agent layer 12 can be specified by detecting Si derived from organosiloxane by X-ray photoelectron spectroscopy (XPS). In the present embodiment, the surface concentration of Si of the slip agent layer 12 measured by XPS is in the range of 0.3 to 1.2 atm %, and preferably 0.5 to 1.0 atm %. When the surface concentration of Si is 0.3 atm % or more, sufficient inkjet printability can be ensured, whereas when the surface concentration of Si is 1.2 atm % or less, the fatty acid amide is less likely to be attached to the seal bar during heat sealing. The measurement of surface elemental concentration by XPS is performed by determining the relative ratio to elements quantitatively detected from XPS wide spectrum as atm % using the band integrated area of each element obtained from narrow spectrum. Regarding silicone oil, a band in which the peak position of bond energy of the Si 2p electron orbital (Si2p) appears in the vicinity of 102 to 103 eV is used.

The surface concentration of Si of the slip agent layer 12 determined by XPS can be measured by an X-ray photoelectron spectroscopy analyzer (JPS-90MXV, produced by JEOL Ltd.) under the following conditions: X-ray source: non-monochromatized MgKa (1253.6 eV) and X-ray output: 100 W (10 kV-10 mA).

According to the inventors' findings, the fatty acid amide is a material necessary for reducing the static friction coefficient of the outermost layer of the packaging material for a power storage device, and necessary for improving the performance of deep drawing. However, fatty acid amides (particularly unsaturated fatty acid amides) are likely to be solidified by heat, and are not preferably used singly. In contrast, silicone oil has a high melting point and is less likely to be solidified by heat; thus, a suitable amount of silicone oil is considered to have the function of suppressing the attachment and solidification of the fatty acid amide to the heat seal bar.

The description in the first embodiment is applied mutatis mutandis to the description of the adhesive layer 13, the metal foil layer 14, the anticorrosion treatment layers 15a and 15b, the sealant adhesive layer 16, and the sealant layer 17.

[Method of Producing Packaging Material]

The description in the first embodiment is applied mutatis mutandis to the description of the method for producing a packaging material, except for the following point.

(Step S14)

Following step S13, the slip agent layer 12 is formed on a surface of the substrate layer 11 on a side opposite to the adhesive layer 13, in the laminate having the substrate layer 11, the adhesive layer 13, the anticorrosion treatment layer 15a, the metal foil layer 14, the anticorrosion treatment layer 15b, the sealant adhesive layer 16, and the sealant layer 17 laminated in this order. In the case of the wet process, the slip agent layer 12 is formed, for example, by mixing the fatty acid amide and silicone oil in solvents having excellent solubility and dispersibility for each or both of them, and applying the mixture by various coating methods. In contrast, in the case of the dry process, the slip agent layer 12 is formed, for example, by transferring the fatty acid amide contained in the sealant layer 17 in a winding roll state to the substrate layer 11, and performing pinching using a roll containing silicone oil. However, the wet process is suitably used, particularly in terms of the content (coating amount) of fatty acid amide and silicone oil, ease of control of the mixing ratio, etc.

Particularly when the wet process is employed, the coating amount of the coating liquid for forming a slip agent layer is not particularly limited, and the fatty acid amide content and the surface concentration of Si of the slip agent layer 12 may be suitably adjusted as specified above. After the application of the coating liquid for forming a slip agent layer, drying treatment is performed at 70 to 100° C. for 1 to 6 seconds, thereby forming the slip agent layer 12.

[Power Storage Device and Method of Producing Power Storage Device]

The description in the first embodiment is applied mutatis mutandis to the description of these issues.

Preferred embodiments of the method of producing the power storage device packaging material and the method of producing the power storage device of the present invention have so far been described in detail. However, the present invention should not be construed as being limited to these specific embodiments, but may be variously modified and changed within the range of the spirit of the present invention recited in the claims.

EXAMPLES

In the following, the present invention will be described in more detail by way of Examples. However, the present invention should not be limited to the following Examples.

Experiment 1

Regarding the first invention, packaging materials for power storage devices were prepared, and their various characteristics were evaluated.

(Preparation of Substrate Layer)

As the substrate layer 11, a polyester film having a corona-treated surface (produced by Unitika, Ltd.; thickness: 25 μm) was prepared.

(Preparation of Coating Liquid for Forming Slip Agent Layer)

Coating Liquid A for Forming Slip Agent Layer

As raw materials of a coating liquid A for forming a slip agent layer, 20 mass % ethylene bis-stearic acid amide water dispersion and 20 mass % stearic acid amide water dispersion were prepared. These dispersions were mixed so that the mass ratio of ethylene bis-stearic acid amide and stearic acid amide was as shown in each table, and the total slip agent concentration was adjusted to 0.1 mass %, thereby preparing the coating liquid A for forming a slip agent layer. Ion exchange water or distilled water was used to adjust the slip agent concentration.

Coating Liquid B for Forming Slip Agent Layer

As a raw material of a coating liquid B for forming a slip agent layer, the erucic acid amide concentration was adjusted to 0.1 mass % using isopropyl alcohol, thereby preparing the coating liquid B for forming a slip agent layer.

Example 1-1

In Example 1-1, a packaging material 10 for a power storage device was produced in the following manner. First, as the metal foil layer 14, soft aluminum foil 8079-O having a thickness of 40 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, per 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. In this case, the sol was baked at a temperature of 150° C. and for a treatment time of 30 seconds.

Then, a polyurethane-based adhesive (thickness: 4 μm) was applied, as the adhesive layer 13, to a surface of the anticorrosion treatment layer 15a of the metal foil layer 14, on a side opposite to the metal foil layer 14. Then, the metal foil layer 14 was adhered to the corona-treated surface of the substrate layer 11 with the adhesive layer 13 interposed therebetween by dry lamination. After that, the structure made up of the substrate layer 11, the adhesive layer 13, the anticorrosion treatment layer 15a, the metal foil layer 14, and the anticorrosion treatment layer 15b was left standing in atmospheric air at 60° C. temperature for 6 days for aging treatment.

Then, the sealant adhesive layer 16 was formed by extruding maleic anhydride modified polypropylene (Trade name: ADMER, manufactured by Mitsui Chemicals, Inc.) serving as a base material of the sealant adhesive layer 16 on a surface of the metal foil layer 14 on a side of the anticorrosion treatment layer 15b. The sealant adhesive layer 16 was ensured to have a thickness of 15 μm. Then, a polyolefin film with a thickness of 30 μm (non-stretched polypropylene film having a sealant adhesive layer 16 side corona-treated surface) serving as the sealant layer 17 was bonded (heat-pressure bonded) to the anticorrosion treatment layer 15b at 200° C. via the sealant adhesive layer 16 by sandwich lamination.

Subsequently, the coating liquid A for forming a slip agent layer prepared as described above was applied to a surface of the substrate layer 11 on a side opposite to the adhesive layer 13 by a kiss reverse coating method. In this case, the coating amount (solid content) of the slip agent was adjusted to 5 mg/m². After coating, drying treatment was performed at 70° C. for 3 seconds to form a slip agent layer 12. Thus, a packaging material 10 for a power storage device was produced.

Examples 1-2 to 1-5 and Comparative Examples 1-1 to 1-6

Packaging materials 10 for power storage devices were produced in a manner similar to Example 1-1, except that the slip agent composition was changed.

Comparative Example 1-7

A packaging material 10 for a power storage device was produced in a manner similar to Example 1-1, except that the coating liquid B for forming a slip agent layer was used in place of the coating liquid A for forming a slip agent layer.

Example 1-6

In place of forming the anticorrosion treatment layers 15a and 15b using the sodium polyphosphate-stabilized cerium oxide sol, the anticorrosion treatment layers 15*a* and 15*b* were formed by performing chromate treatment by applying a treatment liquid made of a phenol resin, a chromium fluoride compound, and phosphoric acid to both surfaces of the metal foil layer 14 to form a coating, and baking the coating. A packaging material 10 for a power storage device was produced in a manner similar to Example 1-1 except for this procedure.

Examples 1-7 to 1-10 and Comparative Examples 1-8 to 1-13

Packaging materials 10 for power storage devices were produced in a manner similar to Example 1-6, except that the slip agent composition was changed.

Example 1-11

A polyurethane-based adhesive (5 μm) was applied as the sealant adhesive layer 16 to a surface of the anticorrosion treatment layer 15*b* on a side opposite to the metal foil layer 14. The polyurethane-based adhesive was prepared by mixing a polyisocyanate with a maleic anhydride modified polyolefin dissolved in a mixed solvent of toluene and methylcyclohexane. Then, a polyolefin film with a thickness of 40 μm (non-stretched polypropylene film having a sealant adhesive layer 16 side corona-treated surface) serving as the sealant layer 17 was bonded to the metal foil layer 14 with the sealant adhesive layer 16 interposed therebetween by dry lamination. After that, the structure made up of the substrate layer 11, the adhesive layer 13, the anticorrosion treatment layer 15*a*, the metal foil layer 14, the anticorrosion treatment layer 15*b*, the sealant adhesive layer 16, and the sealant layer 17 was left standing in atmospheric air at 40° C. temperature for 6 days for aging treatment. A packaging material 10 for a power storage device was produced in a manner similar to Example 1-1 except for this procedure.

Examples 1-12 to 1-15 and Comparative Examples 1-14 to 1-19

Packaging materials 10 for power storage devices were produced in a manner similar to Example 1-11, except that the slip agent composition was changed.

Comparative Example 1-20

A packaging material 10 for a power storage device was produced in a manner similar to Example 1-11, except that the coating liquid B for forming a slip agent layer was used in place of the coating liquid A for forming a slip agent layer.

[Evaluation of Drawing Limit]

For the packaging materials 10 for power storage devices produced in the Examples and Comparative Examples, drawing limit of deep drawing was evaluated by the following method. First, each packaging material 10 for a power storage device was arranged in a forming apparatus with the sealant layer 17 facing upward. Forming depth of the forming apparatus was set to in the range of 3.0 to 6.0 mm per 0.5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby evaluate the maximum value of the drawing limit (drawing depth) in which deep drawing was possible without forming breakage or pinholes. Tables 1 to 3 show the results.

[Seal Bar Attachment Evaluation]

Heat sealing was continuously performed on each of the (roll-shaped) packaging materials 10 for power storage devices produced in the Examples and Comparative Examples (190° C., surface pressure: 0.5 MPa, 3 seconds, 12 hours×5 days). Thereafter, the presence of materials attached to the heat seal bar was checked; when there were attached materials, whether they could be wiped away with a solvent (methyl ethyl ketone, 2-propanol) was confirmed. The results were evaluated according to the following criteria. Tables 1 to 3 show the results.

∘: Attached materials were not visually confirmed.

Δ: Attached materials were visually confirmed. The attached materials could be wiped away with a solvent.

x: Attached materials were visually confirmed. The attached materials could not be wiped away with a solvent.

[Evaluation of Adhesion]

For the packaging materials 10 for a power storage device produced in the Examples and Comparative Examples, the adhesion between the substrate layer 11 and the metal foil layer 14 was evaluated using the following method. First, each packaging material 10 for a power storage device was arranged in a forming apparatus with the sealant layer 17 facing upward. The forming depth of the forming apparatus was set to 5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD).

Then, the cold-formed packaging material 10 was placed in a 100 mL capacity beaker containing 30 mL of 1 M lithium hexafluorophosphate solution (solvent volume ratio=ethyl carbonate:dimethyl carbonate:dimethyl carbonate=1:1:1). Then, the beaker containing the packaging material 10 was sealed in an 18-liter square can and left standing in an environment of 40° C. temperature for 2 hours to expose the packaging material 10 to the electrolyte. After that, the packaging material 10 was taken out of the beaker in the 18-liter square can and placed in a 110° C. oven, or in an environment of 60° C. temperature and 95% humidity, or in 50° C. hot water. Then, the presence/absence of separation between the substrate layer 11 and the metal foil layer 14 of the packaging material 10 was visually checked after 3 weeks and 4 weeks to thereby obtain the maximum value (unit: week) of the period during which no separation was observed between the substrate layer 11 and the metal foil layer 14. Based on the results, adhesion between the substrate layer 11 and the metal foil layer 14 was evaluated according to the following evaluation criteria. Tables 1 to 3 show the results.

A: No separation was observed after 4 weeks.

B: No separation was observed after 3 weeks, but separation was observed after 4 weeks.

TABLE 1

| | Slip agent coating liquid | Slip agent composition (mass %) Fatty acid amide | Slip agent composition (mass %) Fatty acid bisamide | Drawing limit (mm) | Seal bar attachment | Adhesion 110° C. | Adhesion 60° C. 95% | Adhesion 50° C. water |
|---|---|---|---|---|---|---|---|---|
| Example 1-1 | A | 70 | 30 | 6.0 | ○ | A | A | A |
| Example 1-2 | A | 60 | 40 | 6.0 | ○ | A | A | A |
| Example 1-3 | A | 50 | 50 | 6.0 | ○ | A | A | A |
| Example 1-4 | A | 40 | 60 | 6.0 | ○ | A | A | A |
| Example 1-5 | A | 30 | 70 | 6.0 | ○ | A | A | A |
| Comparative Example 1-1 | A | 100 | 0 | 6.0 | x | A | A | A |
| Comparative Example 1-2 | A | 90 | 10 | 6.0 | x | A | A | A |
| Comparative Example 1-3 | A | 80 | 20 | 6.0 | Δ | A | A | A |
| Comparative Example 1-4 | A | 20 | 80 | 5.5 | ○ | A | A | A |
| Comparative Example 1-5 | A | 10 | 90 | 4.5 | ○ | Not evaluated because the drawing limit was less than 5 mm. | | |
| Comparative Example 1-6 | A | 0 | 100 | 3.0 | ○ | | | |
| Comparative Example 1-7 | B | 100 | 0 | 6.0 | x | A | A | A |

TABLE 2

| | Slip agent coating liquid | Slip agent composition (mass %) Fatty acid amide | Slip agent composition (mass %) Fatty acid bisamide | Drawing limit (mm) | Seal bar attachment | Adhesion 110° C. | Adhesion 60° C. 95% | Adhesion 50° C. water |
|---|---|---|---|---|---|---|---|---|
| Example 1-6 | A | 70 | 30 | 6.0 | ○ | B | A | A |
| Example 1-7 | A | 60 | 40 | 6.0 | ○ | B | A | A |
| Example 1-8 | A | 50 | 50 | 6.0 | ○ | B | A | A |
| Example 1-9 | A | 40 | 60 | 6.0 | ○ | B | A | A |
| Example 1-10 | A | 30 | 70 | 6.0 | ○ | B | A | A |
| Comparative Example 1-8 | A | 100 | 0 | 6.0 | x | B | A | A |
| Comparative Example 1-9 | A | 90 | 10 | 6.0 | x | B | A | A |
| Comparative Example 1-10 | A | 80 | 20 | 6.0 | Δ | B | A | A |
| Comparative Example 1-11 | A | 20 | 80 | 5.5 | ○ | B | A | A |
| Comparative Example 1-12 | A | 10 | 90 | 4.5 | ○ | Not evaluated because the drawing limit was less than 5 mm. | | |
| Comparative Example 1-13 | A | 0 | 100 | 3.0 | ○ | | | |

TABLE 3

| | Slip agent coating liquid | Slip agent composition (mass %) Fatty acid amide | Slip agent composition (mass %) Fatty acid bisamide | Drawing limit (mm) | Seal bar attachment | Adhesion 110° C. | Adhesion 60° C. 95% | Adhesion 50° C. water |
|---|---|---|---|---|---|---|---|---|
| Example 1-11 | A | 70 | 30 | 6.0 | ○ | A | A | A |
| Example 1-12 | A | 60 | 40 | 6.0 | ○ | A | A | A |
| Example 1-13 | A | 50 | 50 | 6.0 | ○ | A | A | A |
| Example 1-14 | A | 40 | 60 | 6.0 | ○ | A | A | A |
| Example 1-15 | A | 30 | 70 | 6.0 | ○ | A | A | A |
| Comparative Example 1-14 | A | 100 | 0 | 6.0 | x | A | A | A |
| Comparative Example 1-15 | A | 90 | 10 | 6.0 | x | A | A | A |
| Comparative Example 1-16 | A | 80 | 20 | 6.0 | Δ | A | A | A |

TABLE 3-continued

| | Slip agent coating liquid | Slip agent composition (mass %) | | Drawing | | Adhesion | | |
|---|---|---|---|---|---|---|---|---|
| | | Fatty acid amide | Fatty acid bisamide | limit (mm) | Seal bar attachment | 110° C. | 60° C. 95% | 50° C. water |
| Comparative Example 1-17 | A | 20 | 80 | 5.5 | ○ | A | A | A |
| Comparative Example 1-18 | A | 10 | 90 | 4.5 | ○ | Not evaluated because the drawing limit was less than 5 mm. | | |
| Comparative Example 1-19 | A | 0 | 100 | 3.5 | ○ | | | |
| Comparative Example 1-20 | B | 100 | 0 | 6.0 | x | A | A | A |

The results of Tables 1 to 3 demonstrate that sufficient deep drawing formability and good heat-sealing properties can be exhibited when the slip agent layer contains the fatty acid amide (a) and the fatty acid bisamide (b), the fatty acid amide (a) has a content in the range of 70 to 30 mass %, and the fatty acid bisamide (b) has a content in the range of 30 to 70 mass %.

Experiment 2

Regarding the second invention, packaging materials for power storage devices were produced, and their various characteristics were evaluated.

(Preparation of Substrate Layer)

As the substrate layer 11, a nylon film having a corona-treated surface (thickness: 25 μm) was prepared.

(Preparation of Raw Material for Slip Agent Layer)

The following compounds were used as the raw materials of the slip agent layer. Moreover, the method for forming the slip agent layer was as shown in Table 4. In Table 4, "wet" indicates coating using a coating liquid for forming a slip agent layer (wet process), "dry" indicates coating using a roll containing silicone oil (dry process), and "wet+dry" indicates the combination of coating using the coating liquid and coating using a roll containing silicone oil. Coating liquids for forming a slip agent layer were prepared so that the fatty acid amide content and the surface concentration of Si of the slip agent layer after coating were adjusted as shown in Table 4.

Fatty acid amide: erucic acid amide
Silicone oil: higher fatty acid ester-modified silicone oil TSF410 (produced by Momentive Performance Materials Japan)

Example 2-1

In some Examples, packaging materials 10 for power storage devices were produced in a manner similar to Example 1-1, except that the steps of forming the sealant adhesive layer 16 and the sealant layer 17 were performed by pinching with a roll containing the above silicone oil, and the structure of the slip agent layer 12 was changed as shown in Tables 4 and 5.

In Table 4, the content of fatty acid amide was measured by GC-MS. Moreover, the surface concentration of Si was measured by an X-ray photoelectron spectroscopy analyzer (JPS-90MXV, produced by JEOL Ltd.) under the following conditions: X-ray source: non-monochromatized MgKa (1253.6 eV) and X-ray output: 100 W (10 kV-10 mA).

Examples 2-2 to 2-5 and Comparative Examples 2-1 to 2-3

Packaging materials 10 for power storage devices were produced in a manner similar to Example 2-1, except that the structure of the slip agent layer was changed as shown in Table 5.

Example 2-6

A packaging material 10 for a power storage device was produced in a manner similar to Example 2-1, except that the structure was obtained by dry lamination in a manner similar to Example 1-11.

Examples 2-7 to 2-10 and Comparative Examples 2-4 to 2-8

Packaging materials 10 for power storage devices were produced in a manner similar to Example 2-6, except that the structure of the slip agent layer was changed as shown in Table 5.

TABLE 4

| Slip agent layer structure No. | Slip agent layer forming method | | Fatty acid amide content (mg/m$^2$) | Surface concentration of Si (atm %) |
|---|---|---|---|---|
| | Fatty acid amide | Silicone oil | | |
| 1 | — | Dry | 1 | 0.3 |
| 2 | Wet | Dry | 4 | 0.3 |
| 3 | Wet | Dry + Wet | 4 | 0.8 |
| 4 | Wet | Dry | 10 | 0.3 |
| 5 | Wet | Dry + Wet | 10 | 0.8 |
| 6 | Wet | Dry + Wet | 10 | 1.2 |
| 7 | Wet | Dry | 15 | 0.3 |
| 8 | Wet | Dry + Wet | 4 | 1.5 |
| 9 | — | — | 1 | Not detected |
| 10 | — | Wet | 1 | 0.2 |
| 11 | Wet | Wet | 4 | 0.3 |
| 12 | Wet | Wet | 4 | 0.8 |
| 13 | Wet | Wet | 10 | 0.3 |
| 14 | Wet | Wet | 10 | 0.8 |
| 15 | Wet | Wet | 10 | 1.2 |
| 16 | Wet | Wet | 15 | 0.3 |
| 17 | Wet | Wet | 4 | 1.5 |
| 18 | Wet | Wet | 4 | 0.2 |

Note: In the structure of the present Examples, a small amount of fatty acid amide contained in the sealant layer is transferred to the surface of the substrate layer. This is why some Examples in Table 4 show the fatty acid amide content, although no fatty acid amide was applied.

[Evaluation of Drawing Limit]

For each of the packaging materials 10 for power storage devices produced in the Examples and Comparative Examples, the maximum value of the drawing limit in which deep drawing was possible was determined in a manner similar to Experiment 1, and the results were evaluated according to the following criteria. Table 5 shows the results.

○: The drawing limit was 5.0 mm or more.
×: The drawing limit was less than 5.0 mm.

[Seal Bar Attachment Evaluation]

The presence of materials attached to the heat seal bar was checked; when there were attached materials, whether they could be wiped away with a solvent was confirmed in a manner similar to Experiment 1. The results were evaluated according to the following criteria. Table 5 shows the results.

○: Attached materials were not visually confirmed.
Δ: Attached materials were visually confirmed. The attached materials could be wiped away with a solvent.
×: Attached materials were visually confirmed. The attached materials could not be wiped away with a solvent.

[Evaluation of Printability]

Bar codes were printed on the slip agent layer 12 side of each of the packaging materials 10 for power storage devices produced in the Examples and Comparative Examples using an inkjet printer, and whether the printed bar codes were readable by a bar-code reader was confirmed. The results were evaluated according to the following criteria. Table 5 shows the results.

○: Readable
×: Unreadable

TABLE 5

| | Slip agent layer structure No. | Formability | Seal evaluation | Printability |
|---|---|---|---|---|
| Comparative Example 2-1 | 1 | 3.5 mm | × | ○ | ○ |
| Example 2-1 | 2 | 5.0 mm | ○ | ○ | ○ |
| Example 2-2 | 3 | 5.0 mm | ○ | Δ | ○ |
| Example 2-3 | 4 | 6.0 mm | ○ | ○ | ○ |
| Example 2-4 | 5 | 5.5 mm | ○ | Δ | ○ |
| Example 2-5 | 6 | 5.5 mm | ○ | Δ | ○ |
| Comparative Example 2-2 | 7 | 6.5 mm | ○ | × | ○ |
| Comparative Example 2-3 | 8 | 5.0 mm | ○ | × | ○ |
| Comparative Example 2-4 | 9 | 4.0 mm | × | ○ | × |
| Comparative Example 2-5 | 10 | 4.0 mm | × | ○ | × |
| Example 2-6 | 11 | 5.5 mm | ○ | ○ | ○ |
| Example 2-7 | 12 | 5.5 mm | ○ | Δ | ○ |
| Example 2-8 | 13 | 6.5 mm | ○ | ○ | ○ |
| Example 2-9 | 14 | 6.0 mm | ○ | Δ | ○ |
| Example 2-10 | 15 | 6.0 mm | ○ | Δ | ○ |
| Comparative Example 2-6 | 16 | 7.0 mm | ○ | × | ○ |
| Comparative Example 2-7 | 17 | 5.0 mm | ○ | × | ○ |
| Comparative Example 2-8 | 18 | 5.5 mm | ○ | ○ | × |

The results of Tables 4 and 5 demonstrate that sufficient deep drawing formability and printability, and good heat-sealing properties can be exhibited when the slip agent layer contains a fatty acid amide and silicone oil, the fatty acid amide has a content in the range of 3 to 10 mg/m$^2$, and the slip agent layer has a surface concentration of Si in the range of 0.3 to 1.2 atm %, as measured by X-ray photoelectron spectroscopy.

REFERENCE SIGNS LIST

1 ... Battery element; 2 ... Lead; 10 ... Packaging material (packaging material for power storage device); 11 ... Substrate layer; 12 ... Slip agent layer; 13 ... Adhesive layer; 14 ... Metal foil layer; 15a, 15b ... Anticorrosion treatment layer; 16 ... Sealant adhesive layer; 17 ... Sealant layer; 30 ... Embossed packaging material; 32 ... Shaped area (recess); 34 ... Cover portion; 40 ... Secondary battery.

What is claimed is:

1. A packaging material for a power storage device, comprising:
   a slip agent layer,
   a substrate layer, an adhesive layer, a metal foil layer,
   a sealant adhesive layer, and
   a sealant layer, in this order,
   wherein,
   the slip agent layer consisting essentially of erucic acid amide and a silicone oil,
   the erucic acid amide has a content in a range of 4 to 10 mg/m$^2$ of the slip agent layer, and
   the slip agent layer has a surface concentration of Si in a range of 0.3 to 1.2 atm %, as measured by X-ray photoelectron spectroscopy.

2. The packaging material for a power storage device of claim 1, wherein the substrate layer is a polyester film or a polyamide film.

3. The packaging material for a power storage device of claim 1, wherein the content of the erucic acid amide is in a range of 4 to 6 mg/m$^2$ of the slip agent layer.

4. The packaging material for a power storage device of claim 1, wherein the slip agent layer has the surface concentration of Si in a range of 0.5 to 1.0 atm %, as measured by X-ray photoelectron spectroscopy.

5. The packaging material for a power storage device of claim 1, further comprising anticorrosion treatment layers provided on both surfaces of the metal foil layer.

6. The packaging material for a power storage device of claim 5, wherein the anticorrosion treatment layers each contain a rare earth element oxide, and phosphoric acid or phosphate.

7. The packaging material for a power storage device of claim 6, wherein the rare earth element oxide is cerium oxide.

8. A method of producing a packaging material for a power storage device, the method comprising:
   a step of bonding a substrate layer on one surface of a metal foil layer with an adhesive layer interposed therebetween,
   a step of forming a sealant layer on a surface of the metal foil layer on a side opposite to the adhesive layer with a sealant adhesive layer interposed therebetween, and
   a step of forming a slip agent layer on a surface of the substrate layer on a side opposite to the adhesive layer, wherein,
   the slip agent layer consists essentially of erucic acid amide and a silicone oil,
   the fatty acid amide has a content in a range of 4 to 10 mg/m$^2$, and
   the slip agent layer has a surface concentration of Si in a range of 0.3 to 1.2 atm %, as measured by X-ray photoelectron spectroscopy.

* * * * *